United States Patent Office 3,361,116
Patented Jan. 2, 1968

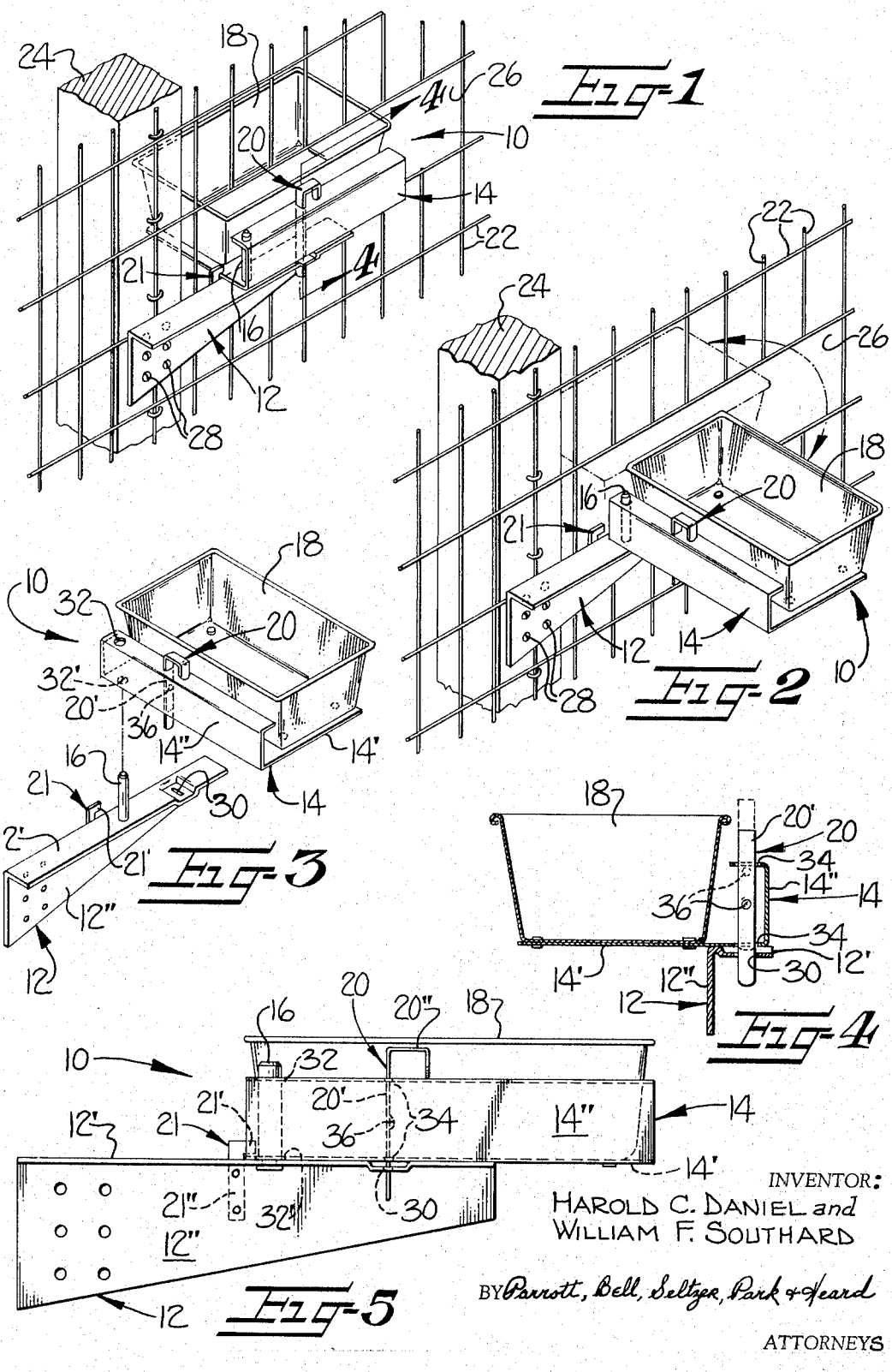

3,361,116
FEEDING DEVICE FOR ANIMAL CAGES
Harold C. Daniel and William F. Southard, Monroe, N.C., assignors to Mechanical Concepts, Inc., Monroe, N.C., a corporation of North Carolina
Filed May 17, 1966, Ser. No. 550,773
5 Claims. (Cl. 119—63)

ABSTRACT OF THE DISCLOSURE

An animal feeding device including a receptacle mounted by first and second brackets for pivotal movement inwardly and outwardly through an opening in a wall of an animal cage between a feeding position and a servicing position and wherein the brackets are so mounted that the bracket carrying the receptacle may be removed from the other bracket merely by being lifted upwardly when the bracket and receptacle are in the servicing position.

---

This invention relates to feeding devices for animal cages, and more particularly to an improved device of the type which is pivotally movable through an opening in the cage wall so as to permit servicing without entry into the cage.

Primary objects of the invention are the provision of a device of the type described which is of highly economical but quite durable construction, which may be installed and serviced with ease, and which is reliable and escape-proof in operation.

A related and more specific object is the provision of a device of the type described in which the feeding receptacle component may be removed, when desired and without the use of any tools or other implements, for purposes of cleaning or replacement.

Another related and more specific object is to provide a device so constructed that even relatively large and strong animals are incapable of upsetting, tilting or deforming the feeding receptacle and other components thereof, notwithstanding the feeding receptacle's capability for both pivotal movement and removal when desired.

Still other objects and advantages will be in part evident and in part pointed out hereinafter in the following description of an illustrative embodiment of the invention, which should be read in conjunction with the accompanying drawing, in which:

FIGURE 1 is a rear perspective view of a feeding device constructed in accordance with the invention and of a portion of the wall of a cage in association with which it is mounted, the pivotal components of the device being shown in an inward, feeding position;

FIGURE 2 is a view similar to FIGURE 1, but with the pivotal components of the device being shown in full lines in an outward, servicing position;

FIGURE 3 is a partially-exploded rear perspective view of the unmounted device, showing how its pivotal components may be disconnected when in their outward, servicing position;

FIGURE 4 is an enlarged vertical section of the device taken along the line and in the direction of the arrows 4—4 of FIGURE 1; and FIGURE 5 is an enlarged rear elevational view of the device.

Referring more specifically to the drawings, the feeding device is identified in its entirety by the numeral 10 and includes generally a first bracket 12, a second bracket 14, pivot means including pivot pin 16, a feeding receptacle 18, locking means including a latch member 20, and a member 21 which is of inverted L shape and which performs certain important functions hereinafter noted.

All of the foregoing components of device 10 are preferably formed of suitable corrosion-resistant metal, and with the exception of pin 16 may each be easily and economically manufactured by a stamping operation.

Device 10 is adapted for use in association with an animal cage which, as shown in FIGURES 1 and 2, may be of the conventional type having a wire-mesh wall 22 supported by spaced vertical posts such as that identified by the numeral 24. A rectangular opening 26 is provided through wall 22 adjacent post 24, or adjacent any other similar support which might be erected if the cage construction should not include the same, at an elevation commensurate with the size of the animal or animals confined within the cage. The size of opening 26, which of course may be readily formed by merely severing the desired number of vertical and horizontal wire-segments of wall 22, is preferably but slightly greater in its vertical and horizontal dimensions than the corresponding dimensions of receptacle 18 of device 10.

Post 24 supports bracket 12 of device 10, which bracket is generally of conventional angle-section shape including a horizontal flange portion 12' and a vertical flange portion 12''. When properly secured to post 24, as by screws 28 extending at one end thereof through suitable bores provided in its flange 12'', bracket 12 extends generally horizontally therefrom rearwardly of and closely parallel to wall 22 and the opening 26 therethrough, the elevation of the bracket being such that its flange 12' is disposed slightly above the wire-strand defining the lower boundary of opening 26. Pivot pin 16 is carried by and extends vertically upwardly from flange 12' at a location approximately midway of the length of bracket 12 and adjacent that extremity of opening 26 closest to post 24. Intermediate pin 16 and the free end of bracket 12, a vertical slot 30 is provided through flange 12'. Intermediate pin 16 and the fixed end of the bracket, but more closely adjacent the former than the latter, member 21 is spot-welded or otherwise suitably secured to the cage-side face of flange 12'' with one of its sections or legs 21'' extending horizontally in the direction of the free end of bracket 12 at an elevation slightly above that of bracket flange 12'.

Bracket 14 of device 10 includes a rectangular base 14', which is of slightly greater dimensions than the bottom of the conventional pan-type receptacle 18 spot-welded or otherwise suitably secured to the upper surface thereof, and an integrally-formed flange 14'' extending first upwardly and then forwardly from the rear edge of base portion 14' so as to terminate in a horizontal portion overlying the base in vertically-spaced parallel relationship thereto. Vertically alined bores 32, 32' provided through flange 14'' and base 14' are adapted to receive pivot pin 16 of bracket 12, as shown in FIGURES 1, 2 and 5, upon bracket 14 being placed upon flange 12' of bracket 12. When thus interconnected, bracket 14 is securely supported by both pin 16 and flange 12' of bracket 12 for pivotal movement in a horizontal plane through opening 26, as indicated by the arrows of FIGURE 2. Inward pivotal movement of bracket 14 and receptacle 18 is limited, as shown in FIGURES 1 and 5, by abutment of an edge of bracket 14 with stop means defined by the vertical leg 21' of member 21. Upon engaging stop means 21', bracket 14 and receptacle 18 are then properly positioned for feeding purposes, the receptacle being disposed within the cage and shielding opening 26 sufficiently to prevent the escape of an animal through such opening.

Accidental displacement of receptacle 18 from its aforesaid feeding position is prohibited, first, by the horizontal leg 21'' of member 21. As shown in FIGURES 1 and 5, at such time as the edge of bracket 14 is in engagement with the vertical leg 21' of member 21, it is then also so positioned immediately beneath the horizontal leg 21" that any appreciable upward displacement of bracket 14 relative to bracket 12 is prohibited. Similarly, inadvertent displacement of bracket 14 by pivotal movement thereof is prohibited by latch member 20. Latch member 20 includes an elongate main body portion 20' which extends through slots 34 provided in flange 14" and base 14' of bracket 14. Slots 34 are vertically alined with each other and, when bracket 14 is disposed in its feeding position illustrated in FIGURES 1, 4 and 5, with slot 30 of bracket 12. Integral with the upper end of main body portion 20' of latch member 20 is a handle portion 20" permitting convenient manipulation of the latch by a user. Handle portion 20" also serves, together with a boss 36 provided intermediate the length of main body portion 20', to prevent complete withdrawal of latch member 20 from slots 34 and the consequential loss thereof possibly resulting from such complete withdrawal. The length of latch member 20 is such that the lower end of main body portion 20' thereof projects through slot 30 when bracket 14 and receptacle 18 are in their inward feeding position, thereby locking them in such position insofar as pivotal movement is concerned.

Movement of bracket 14 and receptacle 18 to a servicing position such as illustrated in FIGURE 2 may be readily achieved merely by raising latch member 20 until the lower end of main body portion 20' thereof clears slot 30, and then pivoting bracket 14 outwardly through opening 26, the pivotal movement being in a clockwise direction as viewed in the drawings. When in a servicing position as shown in FIGURE 2, receptacle 18 may be readily re-filled with food or water by a person standing outside of the cage. Receptacle 18 and bracket 14 may also, if desired, be removed when in their FIGURE 2 position from the other components of device 10. As indicated by FIGURE 3, such removal can be accomplished by merely elevating bracket 14 until bore 32' thereof clears the upper end of pivot pin 16. This capability for removal is highly desirable since it permits receptacle 18 to be everted for more thorough periodic cleaning. It also enables duplicate brackets 14 and receptacles 18 to be employed in conjunction with the other components of the device in such a manner that filling and cleaning of the receptacles 18 may transpire elsewhere than at the cage proper, such as within a kitchen if desired, with only a substitution of one bracket-receptacle unit for another taking place at the cage itself. The original or substitute bracket 14 and receptacle 18 may, of course, be reconnected to bracket 12 simply by replacing the former upon the latter in such a way that pin 16 again projects through bores 32, 32'.

Return of bracket 14 and receptacle 18 from the servicing position thereof shown in FIGURE 2 to the feeding position shown in FIGURE 1 requires only that latch 20 be held upwardly as bracket 14 is pivoted inwardly until its edge engages member 21. Upon such engagement, latch 20 is released and falls by gravity; its lower end entering slot 30. Receptacle 18 is then securely locked in its feeding position by latch 20 and the horizontal leg 21" of member 21.

It will thus be seen that there has been provided a feeding device realizing the objects and possessing the benefits hereinbefore noted. Although a specific embodiment of the device has been shown and described, it is understood that this was for purposes of illustration only, and not for purposes of limitation, the scope of the invention being in accordance with the following claims.

That which is claimed is:

1. A feeding device for animal cages having an opening through a wall thereof and a supporting post or the like adjacent said opening, said device comprising (a) a first bracket adapted to be mounted upon said supporting post and to extend therefrom exteriorly of said wall adjacent said opening therethrough;
(b) a feeding receptacle;
(c) a second bracket connected to and supporting said receptacle;
(d) pivot means detachably interconnecting said brackets and comprising a pivot pin mounted at one end on one of said brackets and terminating at its other end in a free end portion and said other bracket having a bore therein adapted to receive the pivot pin therein to mount said second bracket and said receptacle supported thereby for substantially horizontal pivotal movement inwardly and outwardly through said opening between a first, feeding position wherein said receptacle is disposed within said cage and a second, servicing position wherein said second bracket and said receptacle are disposed without said cage, said pivot pin and bore allowing said second bracket and said receptacle to be removed from said first bracket when in said second position merely by being lifted vertically to remove said pivot pin from said bore;
(e) means carried by said first bracket engageable with said second bracket when said second bracket and receptacle are in said first position for preventing vertical displacement of said second bracket and receptacle relative to said first bracket to prevent removal of the second bracket and receptacle when the same are in the first, feeding position; and
(f) manually operable locking means carried by said brackets for releasably locking said second bracket and said receptacle against pivotal movement when in said first position.

2. A device according to claim 1 wherein said means (e) for preventing vertical displacement of the second bracket and receptacle also comprises stop means engaging said second bracket for arresting inward pivotal movement of said second bracket and said receptacle at said first position thereof.

3. A feeding device according to claim 2 wherein said means (e) for preventing vertical displacement of the second bracket and receptacle comprises a member having a substantially vertical leg and a substantially horizontal leg and wherein in said first position of said second bracket and said receptacle an edge of said second bracket abuts said vertical leg and underlies said horizontal leg of said member.

4. A feeding device according to claim 1 wherein said locking means includes a latch member carried by and manually movable relative to one of said brackets, the other of said brackets having a slot therethrough adapted to receive said latch member when said second bracket and receptacle are in said first position thereof.

5. A feeding device according to claim 1 wherein said first bracket includes a generally horizontally extending flange and wherein said pivot pin is mounted on said horizontally extending flange and extends freely upwardly therefrom, said second bracket having said vertical bore therethrough and being supported upon said flange of said first bracket when said pin is disposed within said bore.

References Cited
UNITED STATES PATENTS

| | | | |
|---|---|---|---|
| 1,602,000 | 10/1926 | Custer | 119—63 |
| 1,869,901 | 8/1932 | Le Fever | 119—61 |
| 2,478,430 | 8/1949 | Stahler | 119—18 |

HUGH R. CHAMBLEE, *Primary Examiner.*